United States Patent [19]
DeBaun

[11] 3,934,418
[45] Jan. 27, 1976

[54] TURBINE ENGINE

[76] Inventor: Earl A. DeBaun, 4447 First Ave., North, St. Petersburg, Fla. 33713

[22] Filed: Dec. 19, 1974

[21] Appl. No.: 534,455

[52] U.S. Cl. .................. 60/624; 60/39.75; 60/597
[51] Int. Cl.² ...................... F02G 3/00; F02C 5/06
[58] Field of Search.................. 60/39.75, 597, 624; 415/202

[56] References Cited
UNITED STATES PATENTS

| | | | |
|---|---|---|---|
| 1,116,730 | 11/1914 | Powell | 60/624 |
| 1,339,483 | 5/1920 | Simpson | 60/624 |
| 2,456,834 | 12/1948 | Napoli | 415/202 |
| 3,013,543 | 12/1961 | Euler | 60/624 |

FOREIGN PATENTS OR APPLICATIONS

| | | | |
|---|---|---|---|
| 508,292 | 9/1930 | Germany | 60/39.75 |

Primary Examiner—Carlton R. Croyle
Assistant Examiner—L. J. Casaregola
Attorney, Agent, or Firm—Robert Henderson

[57] ABSTRACT

A drive shaft for turning wheels of a vehicle or for operating other devices requiring rotary driving motion, has a pair of diametrically opposed compressors non-rotatively mounted upon it and also a dual channeled turbine mounted upon it with a rotor of the turbine keyed to the drive shaft to cause said shaft to turn with said rotor; separate duct means being provided between the two compressors and diametrically opposite points of the turbine's two channels for conducting ignited gas from the compressors to the turbine to drive said rotor and the drive shaft. Each compressor includes a piston, gas intake and exhaust valves, and means for igniting compressed gas in the compressor to charge the ignited gas into the turbine. A single piston cam is keyed to said shaft for operating the pistons of both compressors and two valve cams are keyed to said shaft for opening and closing the intake and exhaust valves of both compressors in timed interrelation with each other and with the reciprocation of the pistons of both compressors.

3 Claims, 6 Drawing Figures

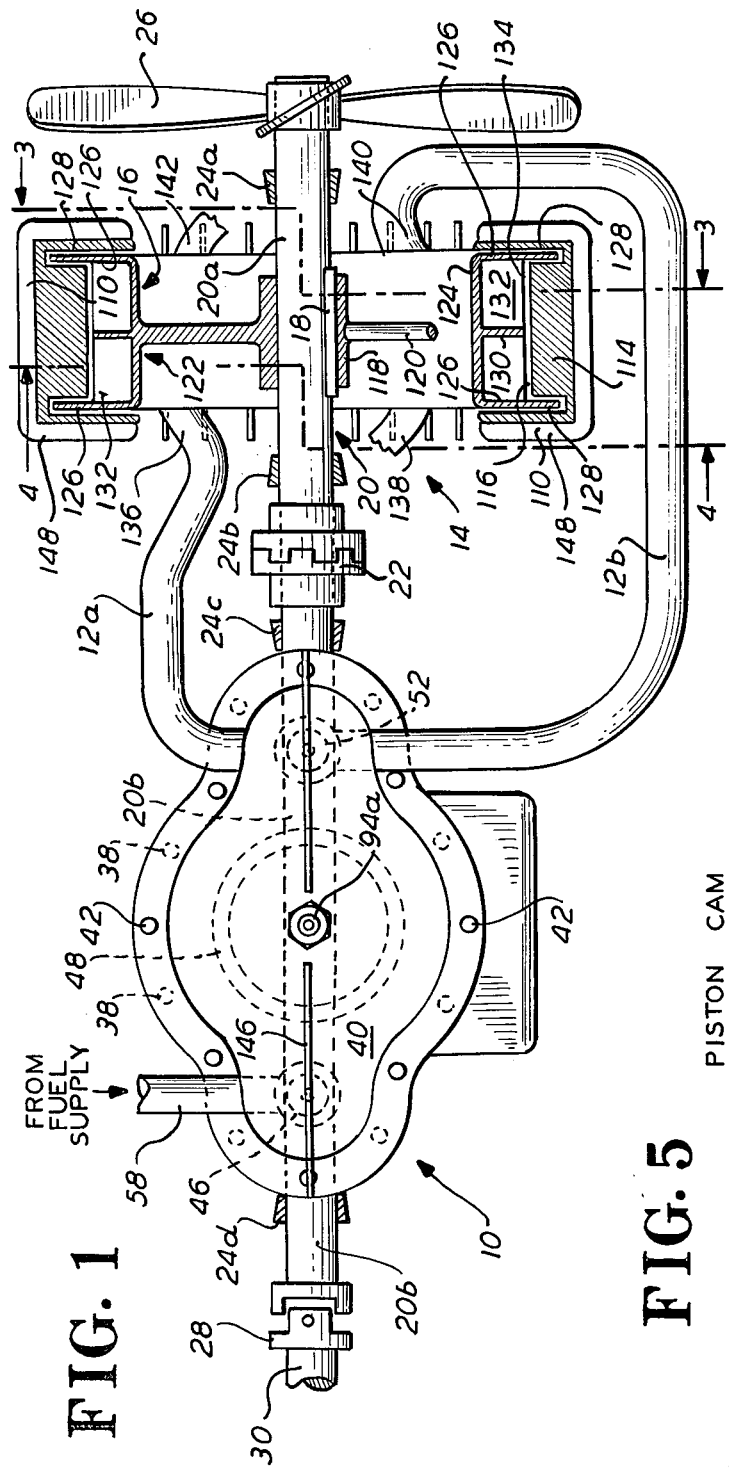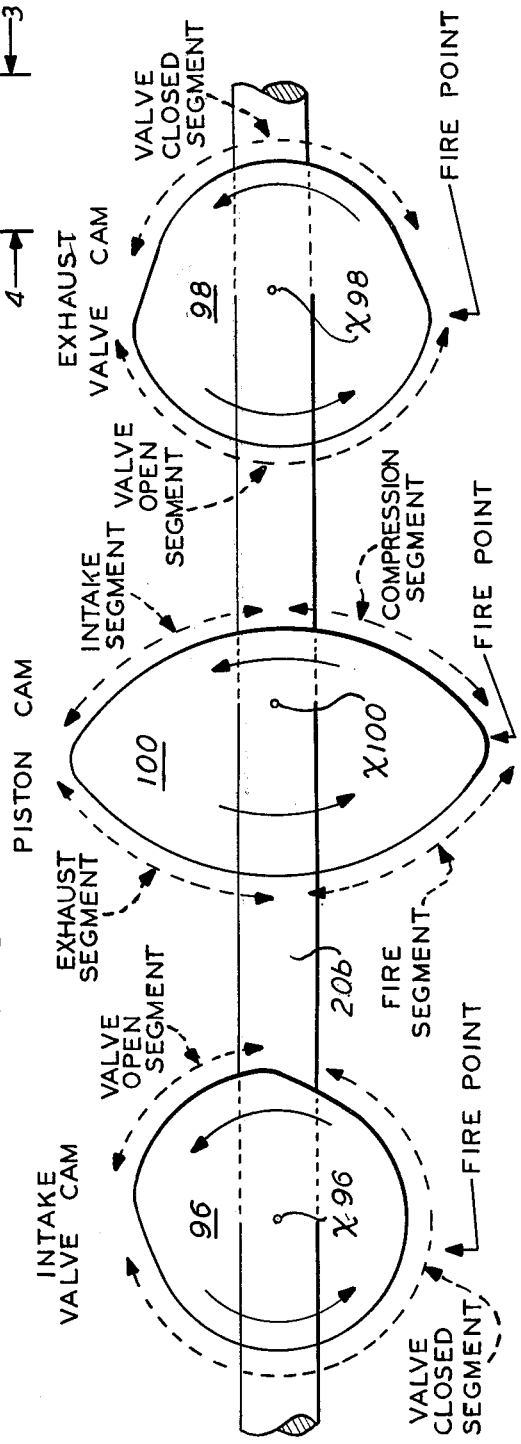
FIG. 1
FIG. 5

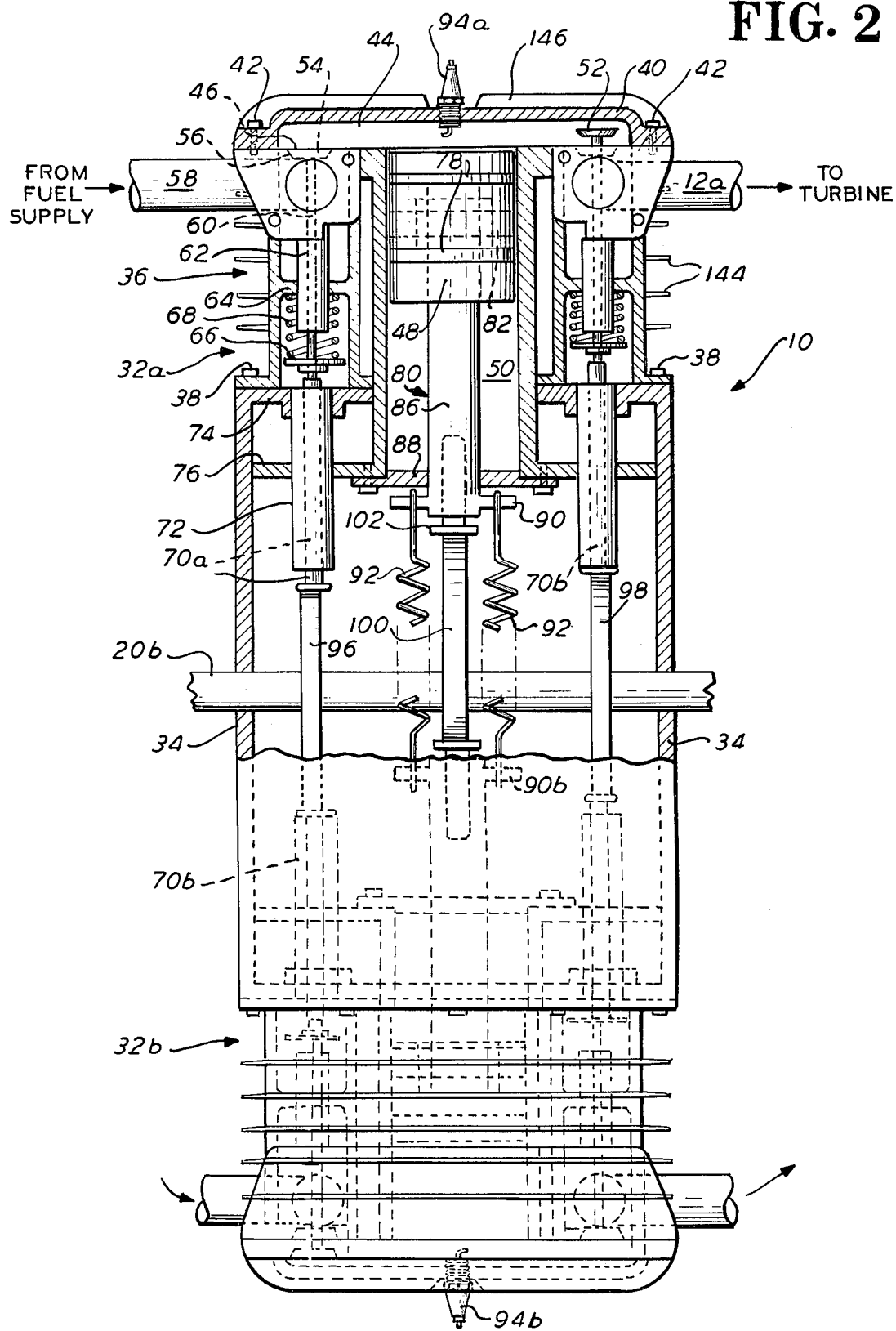

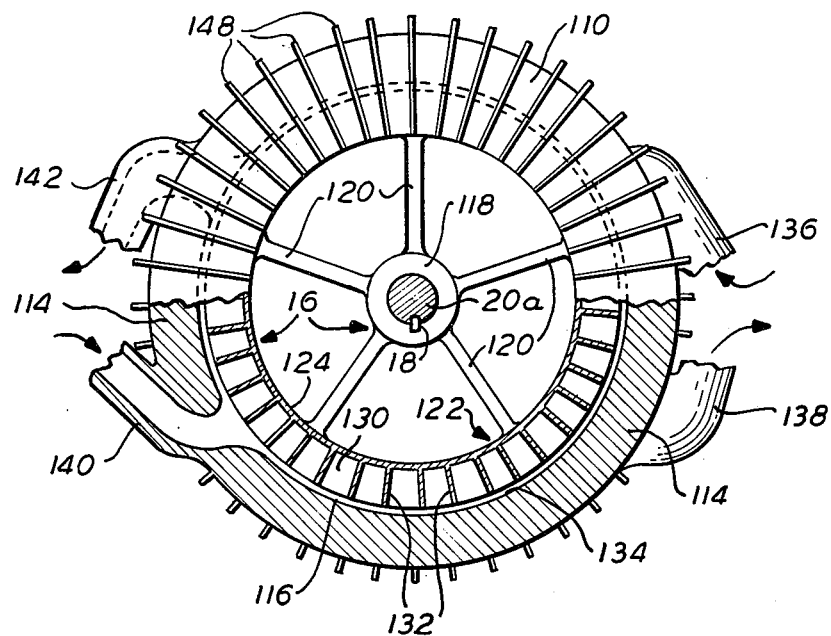
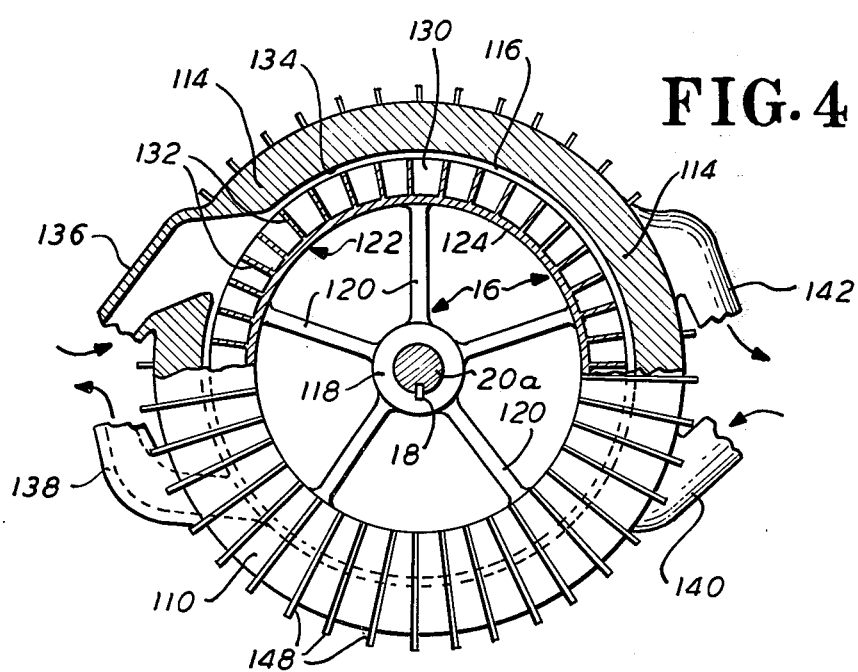

TURBINE ENGINE

BACKGROUND OF THE INVENTION

It has hitherto been common practice, in engines for turning a shaft, for a piston, partly defining a cumbustion chamber, to be mechanically connected directly to a crank or drive shaft thus utilizing the rapidly expanding ignited gas to directly turn the shaft. Even in recently developed rotary engines, equivalents of pistons have been employed, again however, applying gas engendered piston movements directly to the shaft.

The just mentioned practice has led to the use of engines with an excessive number of cylinders and pistons to provide added power and to yield a reasonably smoothe application of power to the drive shaft.

The principal objects of this invention are to provide improved, simplified means for utilizing the expansion of ignited gas to turn a shaft while being capable of providing increased power and smoother operation without the use of an excessive number of cylinders.

Those familiar with the art relating to engines operable through the use of ignited gas will readily recognize other advantages of this invention as hereinafter detailed.

BRIEF DESCRIPTION OF THE ACCOMPANYING DRAWINGS

FIG. 1 is a side view of an engine according to this invention; the compressor being shown in elevation and the turbine being shown in central vertical section.

FIG. 2 is a plan view of the compressor as seen from above FIG. 1; one of the compressor portions being shown in central horizontal section and an opposing portion of the compressor being shown in a plan view with broken line indications of positions of valves and a piston therein.

Figure 6:
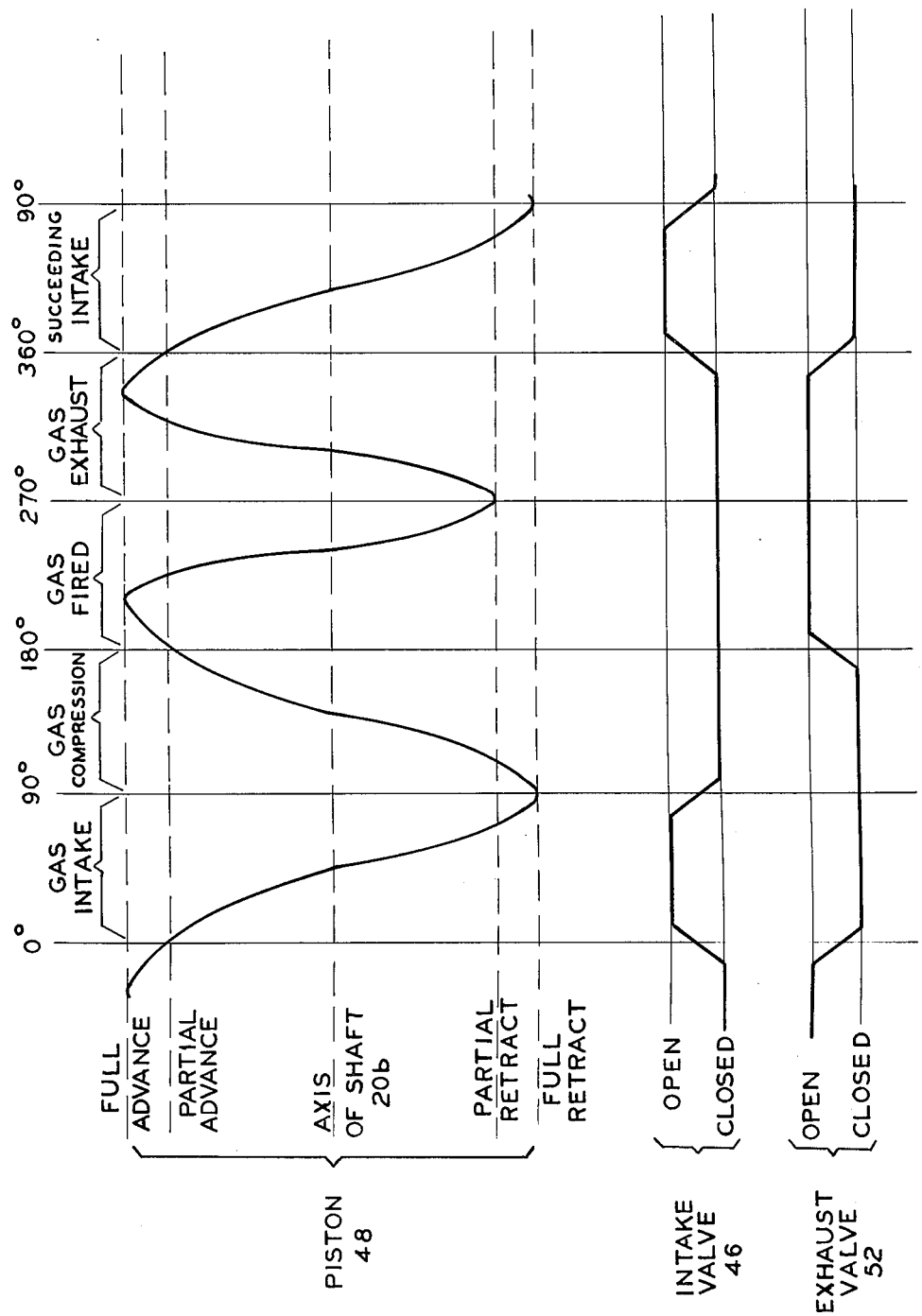

FIGS. 3 and 4 are partial elevational and partial sectional views of opposite side portions of the engine's turbine, approximately as seen, respectively, at lines 3—3 and 4—4 of FIG. 1.

FIG. 5 is an enlarged showing of the approximate shapes and relative angular positions on a common shaft of a cam for actuating a piston in the compressor and of cams for opening and closing intake and exhaust valves in the compressor.

FIG. 6 is a graph illustrating the operating relationships of the piston and valves which are operated by the cams shown in FIG. 5.

DETAILED DESCRIPTION OF THE INVENTION
THE PARTS CONSTITUTING THE ENGINE

The essential parts of the engine of this invention are all included or indicated in FIG. 1; more particularly, a compressor 10 for compressing and igniting gaseous fuel to be conducted from the compressor by pipes 12a and 12b to a turbine 14 of which its rotor 16 is keyed at 18 upon a drive shaft 20 to turn the latter. The shaft 20 is shown as having two parts, 20a related to the turbine 14 and 20b related to the compressor 10; these two parts being interconnected by a coupling 22 and being suitably supported in bearings 24a, 24b, 24c, and 24d. An engine cooling fan 26 is suitably keyed to shaft member 20a, in front of the turbine. The back end of shaft member 20b is connected by a coupling or universal joint 28 to a driven shaft 30 associated with a vehicle (not shown) or other apparatus to be operated by the engine.

THE COMPRESSOR (COMBUSTION GAS GENERATOR)

Compressor (combustion gas generator) 10, as best illustrated in FIG. 2, comprises two, similar, directly opposed gas processing mechanisms 32a and 32b, unified by a central casing 34 through the center of which extends shaft member 20b with the mechanisms 32a and 32b disposed in 180° opposition at opposite sides of said shaft member. As the mechanisms 32a and 32b are alike, the following description of mechanism 32a should be understood as similarly applicable to mechanism 32b.

Several of the more important parts of mechanism 32a are disposed within a compression block 36 suitably fixed, as for example by bolts 38, to the central casing 34. A head 40 is fixed by bolts 42 upon the compression block 36, thereby defining a combustion chamber 44.

The mentioned more important parts include a fuel intake valve 46 controlling the flow of gaseous fuel to the chamber 44 from a suitable fuel supply (indicated but not shown) such as, for example, a carburetor or fuel injection mechanism. Mechanism 32a also includes a piston 48 working in a cylinder 50, and an exhaust valve 52 controlling the flow of ignited and expended gas from the combustion chamber 44 through pipe 12a to the turbine 20.

VALVE ASSEMBLIES OF THE COMPRESSOR

The valves 46 and 52 are shown as alike but, within an engine designer's option, one may be somewhat larger. For present descriptive purposes, they are treated as alike, and the following description of valve 46 and its associated parts should be considered as applicable also to valve 52.

Valve 46 is of the tappet type, having a valve head 54 coacting with a valve seat 56 which opens into a fuel supply pipe 58, and an integral stem 60 which is slidably guided within a guide tube 62 which extends through and is fixedly held by an integral web 64 of the compression block 36. Fixed to the stem 60 adjacent its lower end is a spring saddle 66, and a compressed coil spring 68 extends about the tube 62 and valve stem 60 and is compressed between the web 64 and the saddle 66 to bias the valve 46 normally closed upon the valve seat 56. A push rod 70a is slidably guided within a guide tube 72 fixed in webs 74 and 76 of the compression block 36 and, in a manner hereinafter explained, coacts with a cam arrangement to operate the valve 46.

THE COMPRESSOR'S PISTON ARRANGEMENT

The piston 48 is provided with suitable piston rings 78, and the outer end of a connecting rod 80 extends into a recess of the piston where it is pivotally secured to a wrist pin 82 fixed within the piston. An intermediate portion 86 of the connecting rod is slidably guided within a guide plate 88 to hold said rod against other than rectilinear movement.

The inner end of the connecting rod is formed with an integral crosshead 90; and strong expansion springs 92 are tensioned between said crosshead and a similar crosshead 90b of the piston assembly of the opposed gas processing mechanism 32b to bias the opposed pistons toward their innermost or retracted positions. The two crossheads 90 and 90b coact with a cam arrangement to operate the two opposed pistons in a manner hereinafter explained.

A spark plug 94a is fixed into the head 40 to ignite compressed gas in the combustion chamber 44, and a spark plug 94b is provided in the opposed mechanism for a like purpose. The timing of firing of these plugs is hereinafter explained.

THE COMPRESSOR'S CAM ARRANGEMENT

Three cams, about to be referred to in detail, function similarly with respect to the two gas processing mechanisms 32a and 32b, only excepting the fact that said cams function with respect to said mechanisms at directly opposite (i.e., 180° removed) points in the rotation of drive shaft member 20b.

FIG. 2 shows edgewisely the three mentioned cams as an intake valve cam 96, an exhaust valve cam 98, and a piston cam 100; all three of these cams being suitably keyed upon the shaft member 20b to rotate therewith. FIG. 5 includes side views of said cams to show their shapes; and said figure also shows the relative angular positions in which they are fixed upon the shaft member 20b.

As the shaft member 20b turns continuously under propulsion forces hereinafter explained, cams 96 and 98 open and close valves 46 and 52 respectively through the media of said valves' push rods 70a and 70b; and cam 100 rides upon a rotative tappet 102, which is carried in a suitable bore in the inner end of the connecting rod 80; the cam 100 thus serving to reciprocate piston 48 within the cylinder 50.

OPERATION OF THE COMPRESSOR

Bearing in mind the mentioned similarity of gas processing mechanisms 32a and 32b (except for a 180° operational variance), the following description of the operation of mechanism 32a should serve to afford an understanding of the operation of the compressor 10. FIG. 5 shows that the indicated axes x96, x98 and x100 of the three cams correspond with the axis of shaft member 20b. FIG. 5 also shows the fixed, relative, angular relationships of the three cams upon said shaft member with arrows indicating the direction of rotation of said shaft member and cams.

FIG. 6 indicates the movement of the piston 48 between fully advanced and fully retracted positions throughout four successive quarter turns of shaft member 20b and the cams thereon while, at the lower part of said figure, are shown the open and closed positions of the two valves 46 and 52 throughout the same quarter turns of the shaft member.

In considering the operation of the compressor, it should be considered that, at a commencement of operation, the piston and valves are as indicated at vertical line 0° in FIG. 6 and that the positions of the cams as shown in FIG. 5 correspond to the piston and valve conditions as indicated at said vertical line of FIG. 5.

During a gas intake or first operational cycle, wherein the shaft member and cams pursue a first quarter turn indicated as from said 0° vertical line to the indicated 90° vertical line of FIG. 6, the piston 48 pursues and completes a full retraction movement with the intake valve open and the exhaust valve closed, thereby drawing gaseous fuel from a suitable fuel supply, indicated in FIG. 1, into the combustion chamber 44. The fuel may be supplied through a suitable carburetor or through more or less equivalent fuel supply means.

When the piston 48 has fully retracted as indicated at the 90° line in FIG. 6, a full supply of fuel having been drawn into the combustion chamber 44 including the area in cylinder 50 above the then retracted piston, the intake valve closes while the exhaust valve remains closed.

During a second operational cycle, indicated between the 90° and 180° lines of FIG. 6, the piston 48 is moved by cam 100 from its fully retracted position almost to its fully advanced position thereby substantially compressing the fuel charge in the combustion chamber 44, the two valves, meanwhile, being in closed condition.

A third operational cycle, corresponding to a quarter turn from 180° to 270° of the shaft member 20b and the cams thereon, involves opening of exhaust valve 52 approximately simultaneously with the point of full advance of the piston 48. At about that instant, the compressed fuel charge in the combustion chamber 44 is ignited by the spark plug 94a and is substantially expanded, during which time the piston 48 moves to is partially retracted position indicated at the 270° line in FIG. 6. The indicated timing of ignition is, of course, accomplished by any suitable known means by which an electric circuit to the spark plug is correlated, either directly or indirectly, by gearing, to the rotation of the shaft member 20b.

A fourth operational cycle, corresponding to a quarter turn from 270° to 360° of the shaft member 20b and the cams thereon, involves movement of the piston 48 from its partial retract position to its full advance position at which it arrives just before completion of this quarter turn; the intake valve, meanwhile, remaining closed while the exhaust valve remains open.

The mentioned fourth cycle accomplishes scavenging or exhaustion of expanded gas from the combustion chamber 44, through open exhaust valve 52 into pipe 12a through which the expanded gas is forcibly introduced into one side of the turbine 14 to drive the latter and the shaft members 20a and 20b connected thereto.

Consideration of FIGS. 5 and 6 shows that the described four cycle operation is repetitious to bring about continuous operation of the compressor 10. It should be apparent that the compressor and the turbine are operationally interdependent as the turning of the shaft members 20a and 20b gives rise to continued operation of the compressor which supplies gas to the turbine which turns said shaft members, which serve to drive a vehicle or other mechanism to which they are connected.

Assuming the use of a compressor 10 with two oppositely disposed gas processing mechanisms 32a and 32b as disclosed herein, the above described cyclic operations are identical for the two said mechanisms but occur at directly opposite points in the rotation of shaft member 20b and the cams thereon. It follows that the charging of gases into the turbine 14 through pipe 12a from mechanism 32a and through pipe 12b from mechanism 32b occur at opposite points in the rotation of shaft member 20b, assuring a quite steady supply of gas to the turbine and smoothe operation of the shaft assembly 20a and 20b.

In practicing this invention. the use of at least one pair of opposed compressors is preferable. However, the compressing means, within this invention, may have two or more pairs of compressor assemblies disposed preferably equidistantly about a common shaft member such as member 20b, all such assemblies being operated by a single set of cams such as cams 96, 98, and 100.

THE TURBINE

Although various designs of turbines may lend themselves to use as a part of this invention, a turbine such as indicated at 14 in FIGS. 1, 3, and 4 is considered to possess features peculiarly adapting it for receiving gas charges from the combustion chambers of two or more gas processing mechanisms such as those shown at 32a and 32b.

The turbine 14 comprises a stationary, generally annular housing 110 suitably supported coaxially with reference to shaft member 20a. This housing is U-shaped in radial section and, within it is fixedly fitted an annular insert 114 which partially defines an annular radially outwardly facing gas receiving channel 116.

The turbine 14 also includes the already mentioned rotor 16 having a hub 118 fixed by key 18 upon shaft member 20a, and spokes 120 radiating from said hub and integrally supporting, at their ends, a circular vane carrier 122. The vane carrier comprises a cylindrical wall 124 from opposite sides of which planar skirts 126 project outwardly into annular grooves 128 with a close but free fit. Thus, the wall 124 and skirts 126 combine with an inner cylindrical surface 134 of the insert 114 to completely define the gas receiving channel 116.

The wall 124 is preferably provided with a planar, integral, outwardly extending central web 130, and separate circular series of uniformly spaced radial vanes 132 are fixedly and, preferably, hermetically secured to both sides of the web 130 and to the cylindrical wall 124 and the skirts 126.

The web 130 and the vanes 132 extend outwardly to a close clearance with respect to the inner cylindrical surface 134 of the insert 114. The web 130 serves to strengthen the vanes but, more importantly, it serves to provide separate, but similar, gas receiving areas of the channel 116 at opposite sides of said web to separately receive gas charges from the two gas processing mechanisms 32a and 32b.

As illustrated, the pipe 12a carries expanded gases from gas processing mechanism 32a into one side or rear area of the gas receiving channel 116 through a turbine inlet 136; and a turbine outlet 138 at the same side of the turbine exhausts the more or less energy-spent gases from that particular side area of the channel 116. Similarly, expanded gases introduced into the opposite or front side of the turbine from pipe 12b through a turbine inlet 140 are exhausted from the turbine through a turbine outlet 142.

It will be observed from FIGS. 3 and 4 that gases introduced into opposite sides of the turbine pass through about 320° of the housing 110 so that the gases from the compressor 10 are efficiently used for turning the shaft assembly 20. It is also noteworthy that the power impulses from such gases are uniformly alternated from the opposed gas processing mechanisms 32a and 32b, thus being effective in the turbine alternately at opposite sides of the shaft member 20a, resulting in smoothe application of power to the shaft assembly 20.

OPERATION OF THIS TURBINE ENGINE

The foregoing description of the operation of the compressor 10 and the details given as to the turbine 14 should afford an understanding of the over all operation of the engine of this invention.

Summarizing the engine operation, however, and referring to an engine having only one gas processing mechanism such as 32a, the engine is started by means of suitable hand or motor cranking means (preferably the latter) applied to the shaft assembly 20 to turn the latter.

The rotation of the shaft assembly causes the compressor 10 to go through the described four cycles of gas intake, gas compression, gas ignition, and gas scavenging. In the latter cycle, the advance movement of the piston supplements the expansion of the ignited gas to force such gases through pipe 12a into the turbine to turn shaft member 20a in the latter. Turning of the shaft member 20a brings about the described operation of the compressor so that operation of the engine becomes continuous.

Noting, however, that the engine includes a pair of radially oppositely disposed compressors, the just described operation occurs with respect to each compressor but at spaced points about the shaft assembly, yielding increased power and smoother operation of the engine.

GENERAL COMMENTS

The compressor's block 36 and head 40 are suitably provided with cooling fins 144 and 146, and the turbine housing 110 is suitably provided with cooling fins 148.

Those conversant with the art relating to this invention will readily understand the details of the invention and the manner of its operation as well as its stated advantages including the provision of four cycle operation in a single revolution of a driven shaft, possible minimizing of the number of pistons and cylinders required, and the yielding of smoother engine operation.

It will be realized that the described engine and the components thereof may be somewhat varied without departing from this invention as set forth in the following claims.

I claim:

1. A turbine engine comprising a rotary shaft for driving a related mechanism, a pair of similar compressors mounted diametrically opposite from each other upon said shaft, and a turbine having a rotor fixed to said shaft for rotation therewith and provided with a pair of side-by-side, integral, vaned, annular, gas-receptive channels; each of said compressors comprising a cylinder including a combustion chamber, a piston operative in said cylinder and partially defining said chamber, fuel intake valve means, gas exhaust valve means, ignition means for igniting fuel within said chamber, said pair of compressors including cam means fixed upon said shaft and coacting separately and alternately with said intake valve means of both compressors, with said exhaust valve means of both compressors, and with said pistons of both compressors to reciprocate said pistons; said engine further comprising ducts connecting the combustion chambers of the two compressors separately to diametrically opposite inlets of the two said channels of the turbine, whereby the force of exhaust gases from the combustion chambers of the two compressors is regularly, alternately applied to said turbine rotor at diametrically opposite points thereof to yield smoothe, efficient operation of the engine.

2. A turbine engine according to claim 1, said two channels of the turbine having parallel side walls constraining gases introduced thereinto to travel in forceful coaction with the vanes of said rotor throughout a major circumferential part of each of the channels.

3. A turbine engine according to claim 1, said ducts being of approximately uniform gas conductive capacity throughout their entire lengths from said exhaust valve means to the vanes of the turbine's rotor.

* * * * *